(12) United States Patent
La Forest et al.

(10) Patent No.: US 7,007,361 B2
(45) Date of Patent: Mar. 7, 2006

(54) METHOD OF EXTRACTING AND INSERTING UPPER AND LOWER MOLDS

(75) Inventors: Mark L. La Forest, Granger, IN (US); Christopher S. Wahlers, South Bend, IN (US); Roger L. Klinedinst, North Liberty, IN (US)

(73) Assignee: Honeywell International Inc., Morris Township, NJ (US)

( * ) Notice: Subject to any disclaimer, the term of this patent is extended or adjusted under 35 U.S.C. 154(b) by 435 days.

(21) Appl. No.: 10/367,900

(22) Filed: Feb. 14, 2003

(65) Prior Publication Data

US 2004/0159973 A1 Aug. 19, 2004

(51) Int. Cl.
*B23Q 7/00* (2006.01)

(52) U.S. Cl. .................. 29/407.09; 29/426.1; 29/428; 29/559; 29/281.1; 29/407.1; 29/464; 269/54.4; 269/289 R; 269/317; 269/319; 269/329; 425/186

(58) Field of Classification Search .............. 29/426.1, 29/426.3, 428, 464, 559, 281.1, 281.5, 407.09, 29/407.1; 269/37, 43, 54.4, 58, 289 R, 303, 269/309, 310, 316, 317, 319, 329, 900; 425/186; 414/267

See application file for complete search history.

(56) References Cited

U.S. PATENT DOCUMENTS

| | | |
|---|---|---|
| 4,009,979 A | 3/1977 | Martin |
| 4,202,522 A | 5/1980 | Hanas et al. |
| 4,500,275 A | 2/1985 | Ruhl |
| 4,911,632 A | 3/1990 | Mansfield |
| 5,033,784 A | 7/1991 | Martin |
| 5,308,234 A | 5/1994 | Nicke et al. |
| 5,350,289 A | 9/1994 | Martin |
| 5,562,935 A | 10/1996 | Martin |
| 5,580,587 A | 12/1996 | Leonhartsberger et al. |
| 5,595,771 A | 1/1997 | Foltuz et al. |
| 5,750,161 A | 5/1998 | Schock, Jr. et al. |
| 5,992,208 A | 11/1999 | Hofele et al. |
| 2002/0090409 A1 | 7/2002 | Seger |

*Primary Examiner*—David P. Bryant
*Assistant Examiner*—Jermie E. Cozart
(74) *Attorney, Agent, or Firm*—Birch, Stewart, Kolasch & Birch, LLP

(57) ABSTRACT

A mold fixture 20 for safe and efficient extraction, insertion and storage of mold inserts 26, 28 is provided. The mold fixture 20 includes a lower receiving area 24 for fixedly receiving a lower mold insert 28, an upper receiving area 22 for fixedly receiving an upper mold insert 26. The mold fixture 20 facilitates insertion or extraction of the upper and lower mold inserts 26, 28 into/from a molding machine 1 in a safe and secure manner. Furthermore, the upper and lower mold inserts 26, 28 can be securely stored within the mold fixture 20 at a storage location.

14 Claims, 8 Drawing Sheets

METHOD OF EXTRACTING AND INSERTING UPPER AND LOWER MOLDS

BACKGROUND OF THE INVENTION

1. Field of the Invention

The present invention relates to a mold fixture for use with alignment, installation, extraction, and storage of a mold tooling.

2. Description of the Background Art

Resin Transfer Molding (RTM) is a commonly used fabrication process for the manufacture of fiber-reinforced composites. The resulting light-weight, high strength parts are desirable for a variety of applications. Examples of such applications are commercial items such as chairs, automobile parts and aircraft components.

RTM is typically limited to low viscosity resin systems. The RTM process is fairly simple. A two-part, matched-metal mold (or tool) is made, which has a mold cavity conforming to the shape of the desired part. A preform is placed into the mold cavity, and the mold is closed. The resin is then injected under pressure through injection ports into the mold and follows pre-designed paths, impregnating the preform. After the fill cycle, the cure cycle begins, during which the mold can be heated and resin polymerizes to become rigid plastic. Both the mold and resin can be heated as needed for the application.

RTM tooling requires a method to align the mold halves, a way to introduce resin in the mold, vents to let the air out, a seal to keep the resin in the tool and a method of clamping the tool set together. In addition, the forces acting on an RTM tool demand a well-designed structure including a substantial supporting framework. It is important to establish a highly accurate mold set alignment during the mold building sequence. An effective method of alignment is to use core box pins. These pins are molded in the male and female halves of the tool set and provide an unchanging positive alignment.

RTM can utilize either "hard" or "soft" tooling, depending upon the expected duration of the run. Soft tooling would be either polyester or epoxy molds, while hard tooling may consist of cast machined aluminum, electroformed nickel shell, or machined steel molds. RTM can take advantage of the broadest range of tooling of any composites process. Tooling can range from very low cost to very high cost, long life molds.

Well known in the art is the use of a mold base (or frame), which receives a mold insert (or die insert). Respective halves of the mold insert form an internal injection cavity when clamped together. In order to re-tool a molding apparatus, for example when the desired product is changed, the mold inserts are removed from the mold base and replaced with a different set of mold inserts. An example of such mold frames and mold inserts are those made by the Master Unit Die Products of Greenville, Mich. identified as "MUD" (Master Unit Die) frames and unit die inserts. These frames and inserts are designed to be used in matching pairs wherein the large frames are each arranged to accommodate in a recess of the frame a corresponding die insert.

In order to maintain dimensional stability, the frames are of a heavy construction, generally steel, and, in order to change from one size die insert to another die insert, the first die insert is removed from the frame and replaced with a second die insert.

Because this operation involves a substantial rearrangement of the molding machine and involves the handling of a heavy frame, the operator time and down time for the molding apparatus are a substantial part of the molding process. In particular, because such a changeover may occur daily or even more than once a day, the changeover time is a significant part of the cost of producing the molded product.

Furthermore, in view of the heavy weight of the mold, it is difficult to place the mold into the molding machine and to remove the mold from the machine when the machine is to be used to form a different part. If the mold is not raised and lowered carefully, and because of the heavy weight of the mold or mass imbalance, it becomes very difficult to replace the mold without damaging the mold or the injection molding machine. Additionally, once the mold is removed from the molding machine, the mold must be stored, which is conventionally done by placing the mold onto a pallet and transporting the mold to a storage location.

U.S. Pat. No. 5,992,208 discloses a press arrangement that has sliding tables. These sliding tables carry molds between press stations and are provided in the press stations. An intermediate station is arranged between press stations, this intermediate station containing workpiece holders for the workpiece transport. There, however, arises the problem that the heavy mold must be slid across the sliders by the operator, which can result in injury. Furthermore, there is no provision for efficiently removing the mold from the press arrangement safely and securely, nor are there any provisions for storing the mold once it has been removed.

Because tooling cost and start up time comprise a substantial portion of the cost associated with RTM, a need has arisen for safer and faster initial setups, production changeovers, and storage.

SUMMARY OF THE INVENTION

It is therefore an object of the present invention to provide a mold fixture that is utilized for safe and efficient extraction, insertion and storage of mold inserts. The mold fixture includes a lower receiving area for fixedly receiving a lower mold insert, an upper receiving area for fixedly receiving an upper mold insert. The mold fixture facilitates insertion and extraction of the upper and lower mold inserts into/from a molding machine in a safe and secure manner. Furthermore, the upper and lower mold inserts can be securely stored within the mold fixture at a storage location.

Further scope of applicability of the present invention will become apparent from the detailed description given hereinafter. However, it should be understood that the detailed description and specific examples, while indicating preferred embodiments of the invention, are given by way of illustration only.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
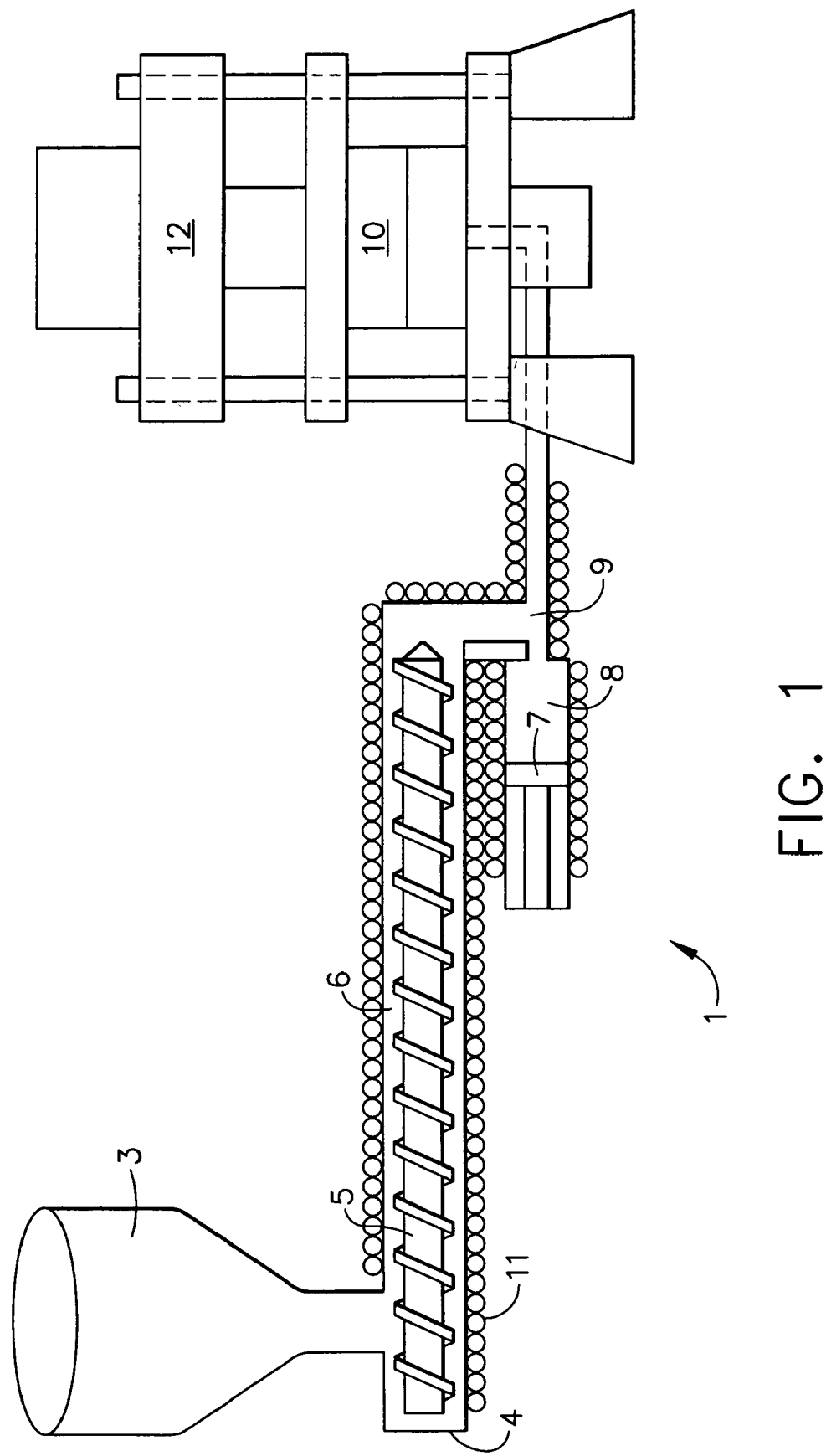
FIG. 1 is a pictorial view of a resin transfer molding apparatus.

FIG. 1 shows an example of a resin transfer molding apparatus 1, which is suitable for implementing principles of the present invention. Raw material, typically resin, is loaded into a hopper 3 attached to an extruder 4. An extruder screw 5 feeds resin from the hopper 3 and progressively heats the resin as it is transported down the length of a barrel 6. The resin is then transported into an accumulator 8. The resin melt pressure created by the extruder 4 forces a piston 7 inside the accumulator 8 back to a desired position. Once the desired volume of resin has been accumulated, the accumulator piston 7 moves forward and forces the volume of resin through a transfer pipe 9 into a cavity of a mold 10. Temperature is controlled using heat exchange coils 11. An arrangement of valves (not depicted) is provided in relation to the transfer pipe 9 to control flow and backflow of the resin, respectively. The part (or preform) to be infiltrated is contained within the mold 10. The mold 10 is contained or located within a press 12. The press 12 can be a hydraulic press. Although a vertically acting press is depicted in FIG. 1, a horizontally acting press can also be used. The clamping force of the press 12, which, for example, has a 500 ton clamp force capability, counteracts the pressure of the resin being forced into the mold cavity. The infiltrated part remains within the mold 10 until the resin cools below the melting point, and the part is then removed. Throughout the several views, like parts will be assigned like reference numerals.

Figure 2:
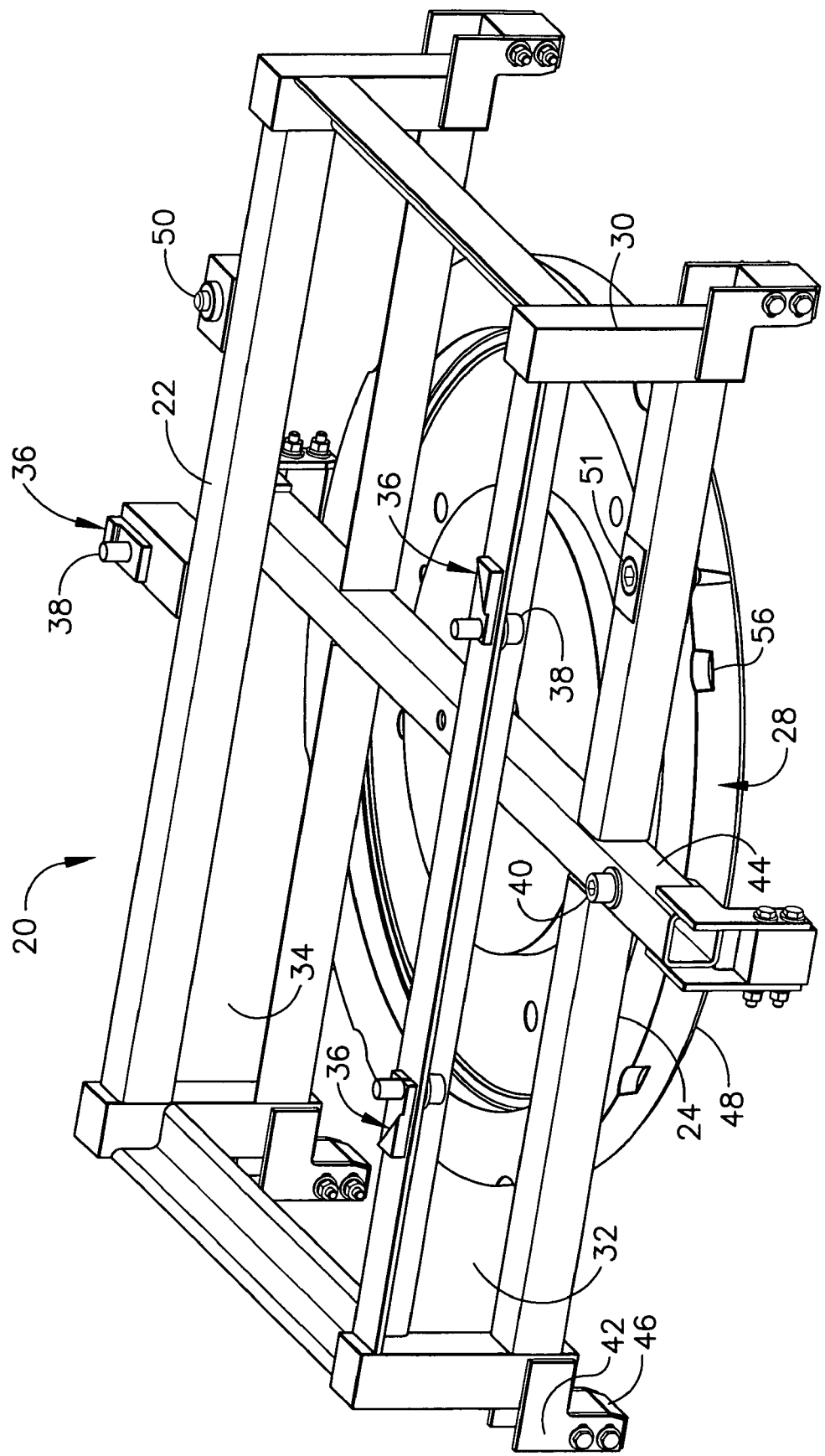
FIG. 2 is a perspective view of a mold fixture, according to a preferred embodiment, having a lower mold insert attached thereto.

FIG. 2 is a perspective view of a mold fixture 20 according to a preferred embodiment of the present invention. The mold fixture 20 includes upper and lower receiving areas 22, 24 for receiving upper and lower mold inserts 26, 28, respectively. These upper and lower mold inserts 26, 28 can typically each weigh 160 pounds or more, depending on the size of the desired product or application and are fastened to a mold or mold frame (not shown) in accordance with conventional techniques. The upper and lower receiving areas 22, 24 are operatively connected to one another via press safety restraints 30. The press safety restraints 30 provide structural support such that the upper mold insert 26 is securely spaced from the lower mold insert 28, and functions as a stop when the press 12 is lowered during an extraction or insertion operation, which is described further hereinbelow. Additionally, front and rear apertures 32, 34 are formed between the upper and lower receiving areas 22, 24 having a height that is determined by the height of the press safety restraints 30.

The mold fixture 20 further includes insert alignment tabs 36 for positioning the upper and lower mold inserts 26, 28 onto the upper and lower receiving areas 22, 24, respectively. Upper and lower insert attachment points 38, 40 are positioned in conjunction with the insert alignment tabs 36 in order to secure the upper and lower mold inserts 26, 28 to the mold fixture 20. These upper and lower insert attachment points 38, 40 are preferably screw type bolts.

Adjustable mold alignment feet 42 are operatively connected to the press safety restraints 30 in the lower receiving area 24. The adjustable mold alignment feet 42 are also provided on each end of a lower crossmember 44, which traverses the lower receiving area 24 in a horizontal plane. The adjustable mold alignment feet 42 have a tapered end 46 and an alignment face 54 in order to facilitate positioning of the mold fixture 20 onto the mold or mold frame. Furthermore, the adjustable mold alignment feet 42 have a height greater than a thickness of the lower mold insert 26, such that when the mold fixture 20 is utilized for storage, a lower surface 48 of the lower mold insert 28 is unobstructed and is free from any force.

Upper and lower spring loaded insert clocking pins 50, 51 are provided on the upper and lower receiving areas 22, 24 for facilitating initial upper or lower mold insert 26, 28 attachment to the mold fixture 20, for example, when a mold insert must be removed from the mold fixture 20 for repair or when a new mold insert is attached to the mold fixture 20. When, for example, a new mold insert is attached to the mold fixture 20, the mold inserts must be angularly aligned in order to achieve the correct positioning of the mold inserts. This is performed by rotating either the upper or lower mold insert 26, 28 on the mold fixture 20 within the insert alignment tabs 36 until either the upper or lower spring loaded insert clocking pins 50, 51 engage with an accompanying slot (not shown) provided in the upper of lower mold insert 26, 28. Thereafter, the upper and lower insert attachment points 38, 40 are utilized to fixedly secure the upper and lower mold inserts 26, 28 to the mold fixture 20.

Figure 3:
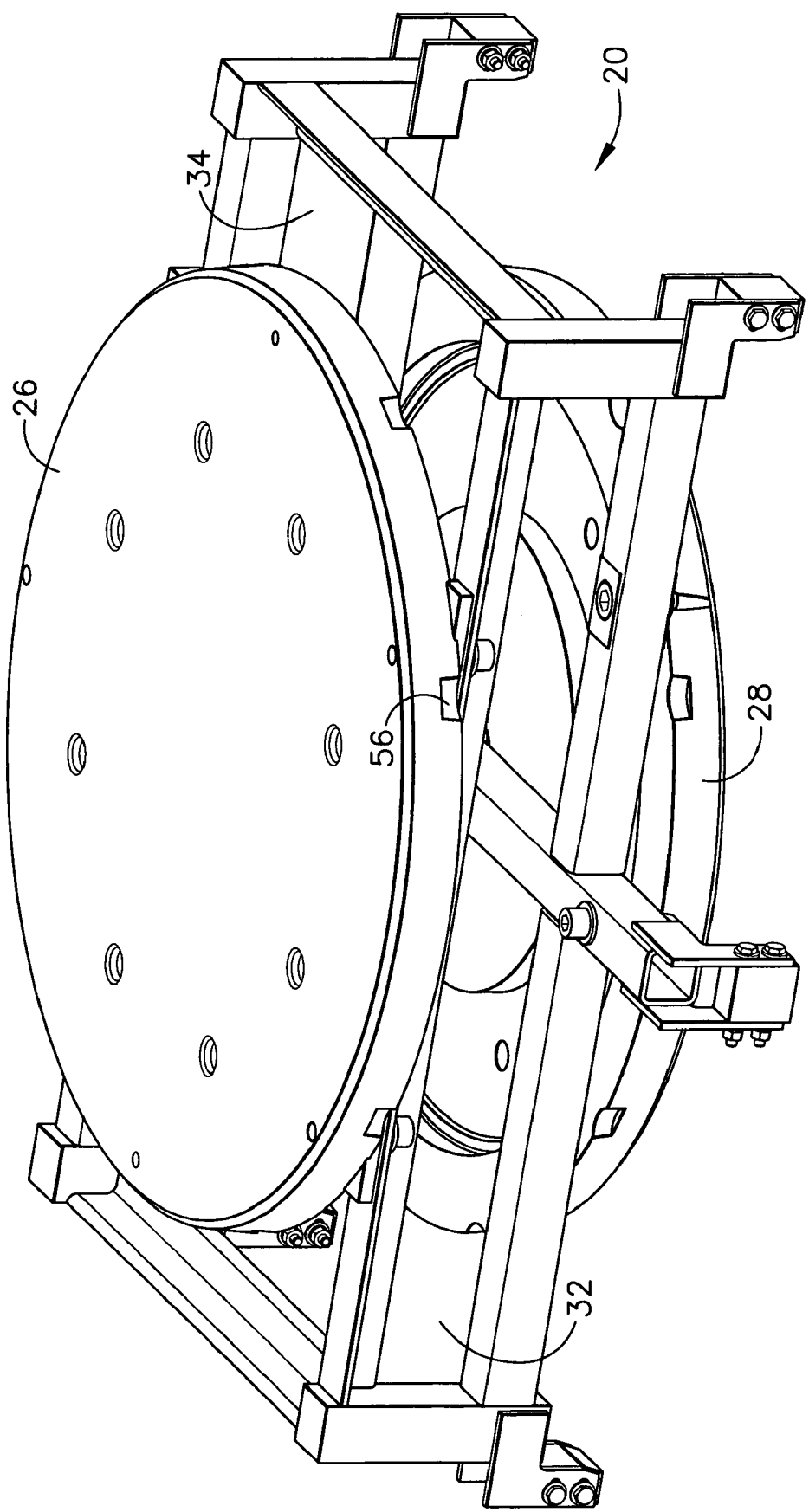
FIG. 3 is a perspective view of a mold fixture having an upper and lower mold insert attached thereto according to a preferred embodiment.

FIG. 3 is a perspective view of the mold fixture 20 having the upper and lower mold inserts 26, 28 attached thereto. With either one or both the upper and lower mold inserts 26, 28 securely attached to the mold fixture 20, the mold fixture 20 can be transported onto and from the press 12, to and from a storage location, by a transport device (not shown). The transport device, such as a forklift, is able to receive the mold fixture 20 thereonto by inserting forks through the front and rear apertures 32, 34. Additional transport configurations, providing secure and safe transport, may also be facilitated.

Figure 4:
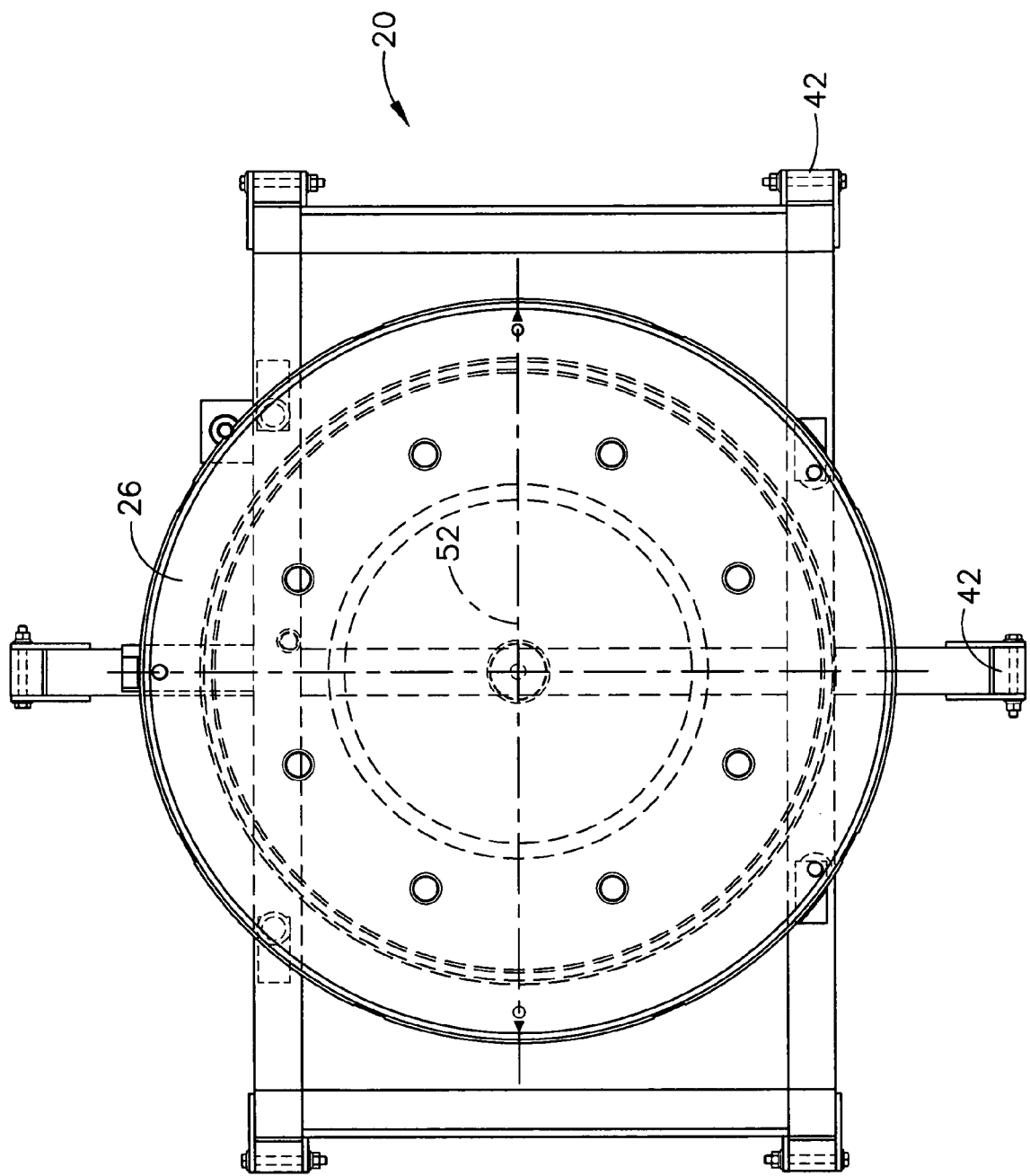
FIG. 4 is a top view of a mold fixture according to a preferred embodiment.
Figure 5:
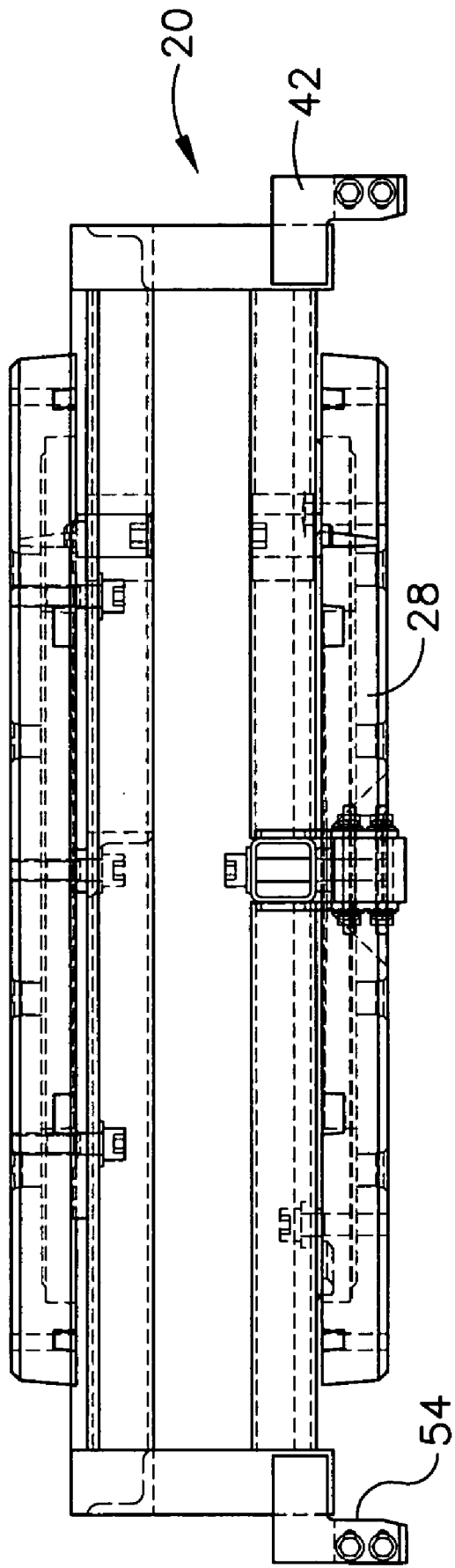
FIG. 5 is a front view of a mold fixture according to a preferred embodiment.
Figure 6:
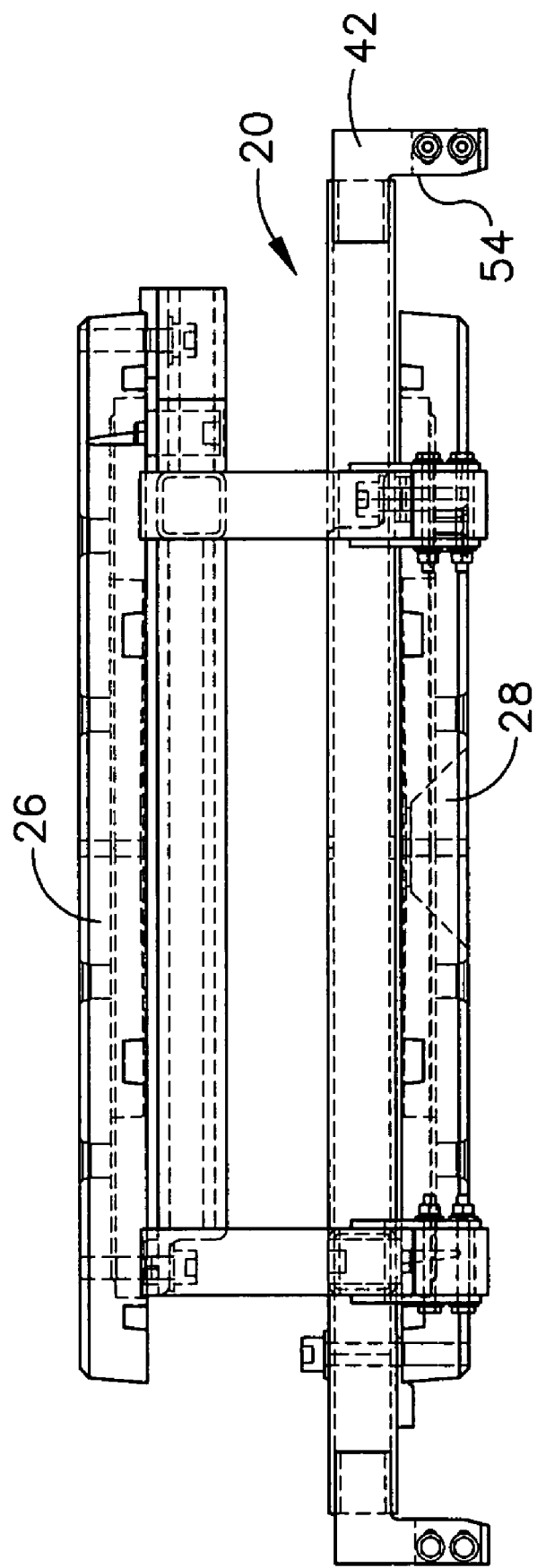
FIG. 6 is a side view of a mold fixture according to a preferred embodiment.

FIG. 4 is a top view of the mold fixture 20, which has the upper mold insert 26 shown attached thereto. It can be readily seen, and referring to FIGS. 5 and 6, that the adjustable mold alignment feet 42 are positioned such that they do not interfere with the lower mold insert 28 because they are positioned at a distance, on the mold fixture 20, greater than a diameter 52 of the lower mold insert 28. Furthermore, the adjustable mold alignment feet 42 can be adjusted in a horizontal and vertical direction.

Figure 7:
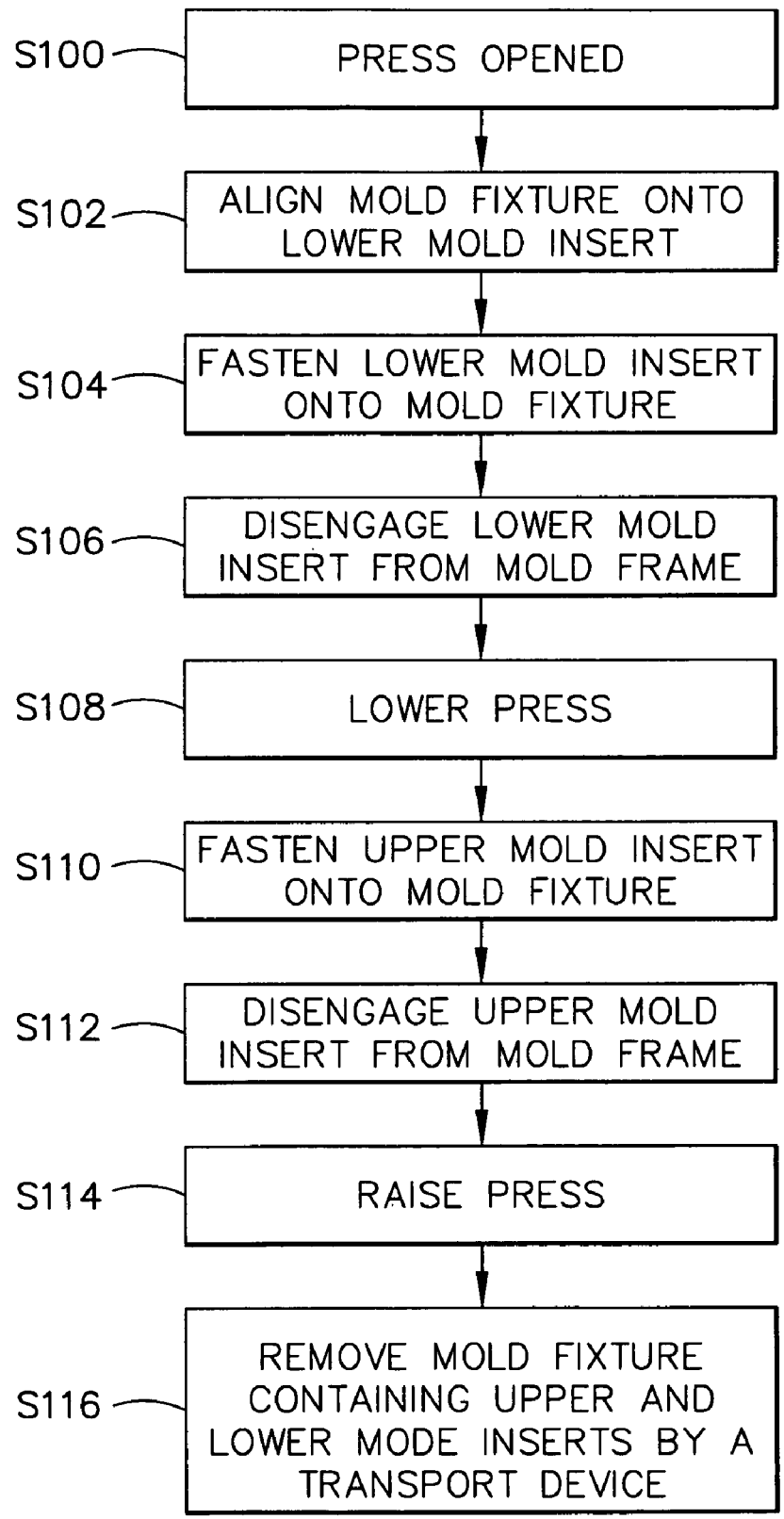
FIG. 7 is a process diagram outlining an extraction process of mold inserts according to a preferred embodiment.

Referring to FIG. 7, an extraction operation of the mold inserts 26, 28 will now be explained. First, in step S100, the press 12 is opened, separating the upper mold insert 26 from the lower mold insert 28, such that the mold fixture 20 can be moved therebetween. In step S102, the mold fixture 20 is positioned into the space created by the opening of the press 12 via the use of a transport device, which utilizes the apertures 32, 34 in order to retain stability of the mold fixture 20, thereby eliminating mass imbalance. The transport device then lowers the mold fixture 20 onto the lower mold insert 28, whereby the tapered end 46 of the adjustable mold alignment feet 42 facilitates positioning of the mold fixture 20, e.g., within a few thousands of an inch to the desired position, such that the alignment face 54 of the adjustable mold alignment feet 42 abuts a side surface (not shown) of the mold or mold frame. Next, in step S104 the lower mold insert 28 is securely fastened onto the mold fixture 20 by the lower insert attachment points 40, which, as stated above, can be a screw-type bolt or other suitable attachment device.

After the lower mold insert 28 is securely fastened onto the mold fixture 20, the mold insert 28 is disengaged from the mold frame in step S106. Thereafter, the press lowers the upper mold insert 26 onto the upper receiving area 22 of the mold fixture 20 in step S108. Then, in step S10 the upper mold insert 26 is securely fastened onto the mold fixture 20 by the upper insert attachment points 38. Once the upper mold insert 26 is securely attached to the mold fixture 20, the upper mold insert 26 is disengaged from the mold frame in step S112. The press 12 is then raised in step S114 and the mold fixture 20 containing the upper and lower mold inserts 26, 28 can be removed from the press 12 and transported safely and securely to a storage location in step S116.

Figure 8:
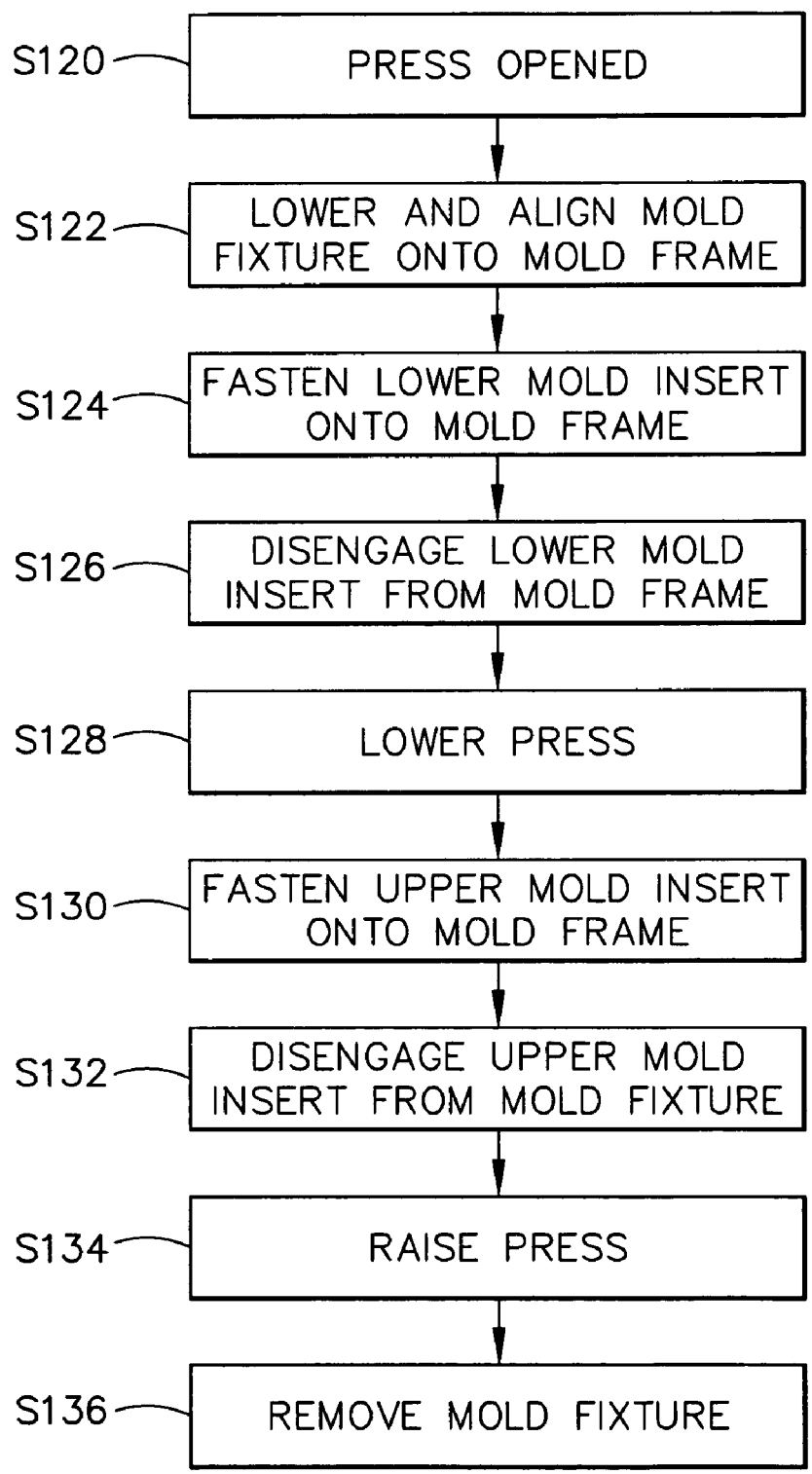
FIG. 8 is a process diagram outlining an insertion process of mold inserts according to a preferred embodiment.

Next, a mold insert insertion process will be explained with reference to FIG. 8. In step S120 the press 12 is opened and the mold fixture 20 containing the upper and lower mold inserts 26, 28 is transported by a transport device into the opening formed by the press. The mold fixture 20 is lowered onto the mold or mold frame contained within the press 12 in step S122, whereby the tapered end 46 of the adjustable mold alignment feet 42 facilitates positioning of the mold fixture 20, e.g., within a few thousands of an inch, to the desired position such that the alignment face 54 of the adjustable mold alignment feet 42 abuts the side surface of the mold or mold frame. In step S124, the lower mold insert 28 is fastened to the mold frame in a conventional manner. Thereafter, in step S126, the lower mold insert 28 is disengaged from the mold fixture 20 by disengaging the lower insert attachment points 40. The press 12 is then lowered, in step S128, to a point where the upper mold insert 26 is positioned for attachment to the mold or mold frame.

The upper mold insert 26 is then fastened to the mold frame in a conventional manner in step S130, for example by spool locks (not shown) locking into spool scallops 56, which are provided on the upper and lower mold inserts 26, 28. Then, in step S132, the upper mold insert 26 is disengaged from the mold fixture 20 by disengaging the upper insert attachment points 38. Next, the press 12 is raised in step S134 such that the upper mold insert 26 is lifted in conjunction with the mold frame away from the mold fixture 20. Finally, the mold fixture 20 is removed from the press 12 by the transport device and placed in a storage location in step S136.

An additional advantage of the present invention is that the operator changing the upper and lower mold inserts 26, 28 does not have to wait for either of the inserts to cool down from temperatures incurred during a molding process, because the operator does not have to directly contact the mold inserts during a change over process. Also, one operator is able to change the mold inserts, whereas conventionally several operators were required. Therefore, change over time of the mold inserts can be reduced as compared to the conventional art.

Although an embodiment of the present invention has been described above in the context of RTM, principles of the present invention may also be applied to facilitate tooling in other environments, for example plastic, powder injection machines, or any molding machine that requires molds or mold inserts.

What is claimed is:

1. A method of extracting upper and lower molds from a mold frame of a molding machine, the steps of the method comprising:
   aligning a mold fixture into a space formed by separating the upper mold from the lower mold;
   lowering the mold fixture onto the lower mold;
   securing the lower mold fixedly onto the mold fixture;
   lowering the upper mold onto the mold fixture;
   securing the upper mold fixedly onto the mold fixture; and
   removing the mold fixture, fixedly containing the upper and lower molds, from the space.

2. The method according to claim 1, wherein a transport device removes the mold fixture from the space.

3. The method according to claim 1, wherein the upper and lower molds are upper and lower mold inserts, respectively.

4. The method according to claim 1, further comprising the steps of:
   detaching the upper mold from the mold frame; and
   detaching the lower mold from the mold frame.

5. The method according to claim 1, wherein mold alignment feet facilitate the alignment of the mold fixture.

6. The method according to claim 1, wherein lower insert attachment points are used to secure the lower mold to the mold fixture.

7. The method according to claim 1, wherein upper insert attachment points are used to secure the upper mold to the mold fixture.

8. A method of inserting upper and lower molds to a mold frame of a molding machine, the steps of the method comprising:
   aligning a mold fixture, fixedly containing the upper and lower mold, into a space of the mold frame;
   lowering the mold fixture onto a lower mold frame;
   securing the lower mold fixedly onto the lower mold frame;
   lowering an upper mold frame onto the mold fixture;
   securing the upper mold fixedly onto the upper mold frame; and
   removing the mold fixture from the space.

9. The method according to claim 8, wherein the space is formed by separating the upper mold frame from the lower mold frame.

10. The method according to claim 8, wherein a transport device places the mold fixture into the space.

11. The method according to claim 8, further comprising the steps of:
    detaching the upper mold from the mold fixture; and
    detaching the lower mold from the mold fixture.

12. The method according to claim 8, wherein mold alignment feet facilitate the alignment of the mold fixture.

13. The method according to claim 8, wherein lower insert attachment points secure the lower mold to the mold fixture and upper insert attachment points secure the upper mold to the mold fixture.

14. The method according to claim 8, wherein the upper and lower molds are upper and lower mold inserts, respectively.

* * * * *